United States Patent [19]

Takase et al.

[11] 4,112,721
[45] Sep. 12, 1978

[54] NC COIL SPRING MANUFACTURING APPARATUS

[75] Inventors: Hirobumi Takase, Yokohama; Yutaka Utsunomiya, Ina, both of Japan

[73] Assignee: NHK Spring Co., Ltd., Yokohama, Japan

[21] Appl. No.: 784,917

[22] Filed: Apr. 5, 1977

[30] Foreign Application Priority Data

Apr. 7, 1976 [JP] Japan .................................. 51-39089
Dec. 18, 1976 [JP] Japan ................................ 51-152635

[51] Int. Cl.² ........................... B21F 3/04; B21F 11/00
[52] U.S. Cl. ........................................ 72/12; 72/132; 72/138; 72/142
[58] Field of Search ...................................... 72/10-12, 72/21-24, 26, 27, 37, 129, 132, 135, 138, 139, 142, 143

[56] References Cited

U.S. PATENT DOCUMENTS

| | | | |
|---|---|---|---|
| 3,433,041 | 3/1969 | Cavagnero et al. | 72/138 |
| 3,610,006 | 10/1971 | Scheublein et al. | 72/138 X |
| 3,641,794 | 2/1972 | Lidert | 72/138 X |
| 3,906,766 | 9/1975 | Sato | 72/132 |

FOREIGN PATENT DOCUMENTS

| | | | |
|---|---|---|---|
| 478,656 | 11/1975 | U.S.S.R. | 72/138 |
| 487,693 | 2/1976 | U.S.S.R. | 72/138 |

OTHER PUBLICATIONS

"Electronic Control of Wire Forming", Stanley J. Brym, Springs Magazine, May 1969, pp. 21-25.

*Primary Examiner*—E. M. Combs

[57] ABSTRACT

The NC coil spring manufacturing apparatus of this invention is an apparatus for manufacturing a variety of coil springs according to predetermined programs controlled by instruction signals transmitted from a microcomputer, comprising a pitch feed mechanism for enabling a pitch tool to start and stop quickly for and at an end turn processing position, a diameter tool feed mechanism for enabling a coiling point to shift quickly against the thrust by an element wire, a means for digitally measuring the dimensions of a wound coil spring, and a means for selecting the coil spring according to the result of such measurement, and employing a pulse motor for driving feed rollers for element wire, controlled by the computer and requiring only a simple control circuit; thus manufacturing precise and uniform coil springs efficiently.

11 Claims, 10 Drawing Figures

NC COIL SPRING MANUFACTURING APPARATUS

This invention relates to a NC or numerically controlled coil spring manufacturing apparatus comprising a coil spring forming mechanism provided with a pitch tool, a diameter tool, and a cutter, feed rollers for supplying said coil spring forming mechanism with an element wire, and a driving mechanism for the feed rollers.

The coil spring manufacturing apparatus is already basically disclosed in treatise "Electronic Control of Wire Forming" by Stanley J. Brym in the magazine "Spring" May 1969.

However, the conventional coil spring manufacturing apparatus have been subject to drawbacks that (a) the use of a preset counter has limited the number of data to be inputted and required relatively long time in renewal and modification of input data, (b) the travels of the coiling point, pitch tool and cutter have had to be calculated to divide into small portions to obtain the respective dividing points, the obtained results being fed into the preset counter, (c) there has been provided no reliable measuring device for inspection of products, (d) it has been difficult to cut off the element wire from the conical spring at the periphery thereof after forming such spring due to the relatively low shifting speed of the coiling point, (e) in manufacturing a coil spring having end turn sections or closely coiled sections at the end portions, the change of pitch from the closely coiled section to the predetermined pitch section is made relatively slowly due to the relatively low shifting speed of the pitch tool, thereby affecting the performance of the coil spring adversely, (f) the feed rollers for wire feed have been driven by means of a continuously rotating motor such as induction motor, synchronous motor, and DC motor, so that it has not been easy to control the feed rollers precisely at a desired speed, and (g) the shifting speeds of the pitch tool and the coiling point have been relatively low as described above, and there have been required a long time interval for coil spring forming and for cutting off the coil spring, thereby reducing the productivity.

The conventional measuring devices, as mentioned above, have not been reliable because they have been analog measuring instruments utilizing mechanical contact, electric capacity, and light which are generally low in accuracy and susceptible to the environmental conditions such as temperature, humidity, dust, etc.

An object of this invention is to provide a coil spring manufacturing apparatus free from the aforementioned drawbacks as have been possessed by the conventional coil spring manufacturing apparatus, provided with a microcomputer having a sufficient memory capacity for calculating detailed data for NC control according to a simple indicating input, storing the calculated data and performing NC control according to such data, and capable of forming high performance coil springs, securing efficient production of coil springs with various shapes and dimensions according to the programs stored in the microcomputer.

In order to attain the aforesaid object, the NC coil spring manufacturing apparatus of this invention is provided with a coil spring forming mechanism having a pitch tool, a coiling point, and a cutter; feed rollers for feeding an element wire into the coil spring forming mechanism; a mechanism for driving the feed rollers; a microcomputer having a memory storage and a central processing unit; an input unit for inputting data for coil spring forming into the computer; a rotary encoder for transmitting a pulse signal at a frequency corresponding to the travelling speed of the element wire; first, second and third counters for receiving setting signals transmitted from the computer and pulse signals transmitted from the rotary encoder and transmitting control signals for driving the pitch tool, coiling point, and cutter respectively; a pulse motor for pitch tool and a pulse motor for coiling point to rotate receiving control signals from the first and second counters respectively; and a pitch tool feed mechanism driven by the pulse motor for pitch tool to start the pitch tool from a close coiling position at an initial speed and stop the pitch tool at the close coiling position suddenly from an operative state at a speed.

Though the above-mentioned object may be attained by the said coil spring manufacturing apparatus, if such apparatus is further provided with a diameter tool feed mechanism provided with an energizing means to thrust the coiling point in the moving direction thereof so as to reduce the load to be applied to the pulse motor when the coiling point is moved toward the center of the coil spring subject to coiling process driven by the pulse motor for coiling point, the coiling point, after coiling a conical spring, may be driven quickly against the thrust force brought by the travelling element wire, so that the coil spring may be cut precisely at the periphery of the coiled section, thereby improving the configuration and performance of the coil spring.

Moreover, if the apparatus is further provided with a digital measuring device for measuring the dimensions of a formed coil spring according to signals from the third counter when the length of the feeded element wire has attained the predetermined value and transmitting the measurement results, and a selecting device for selecting the coil spring, cut according to signals from the third counter immediately after such measurement, by means of signals transmitted from the microcomputer on the basis of the measurement results in accordance with the predetermined dimensional classification, the products may be sorted automatically, and, according to the measurement results, the informations stored in the microcomputer may be corrected automatically, thereby reducing the anticipated number of products defective in dimensions.

Furthermore, if a pulse motor driven according to instruction signals transmitted from the microcomputer is used as the driving source of the mechanism for driving the feed rollers to feed the element wire, such pulse motor may be driven highly diversely and accurately by the signals from the computer, and there will be no need of feedback circuit which may otherwise be often required, securing easy and accurate control of such pulse motor.

This invention can be more fully understood from the following detailed description when taken in condunction with the accompanying drawings, in which.

Figure 1:
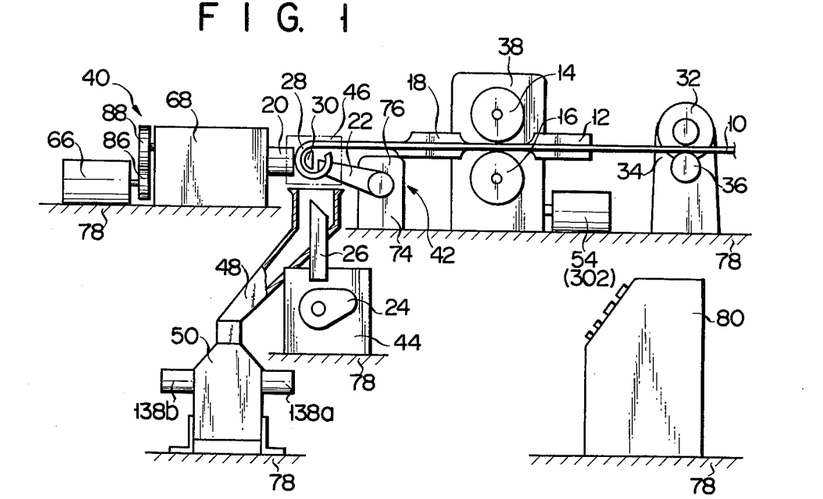
FIG. 1 is a general view of the NC coil spring manufacturing apparatus of this invention.

Referring now to FIG. 1, there is shown an outline of the arrangement of the NC coil spring manufacturing apparatus according to an embodiment of this invention. The sizes of the parts and the positional relation among them are enlarged or reduced suitably. In FIG. 1, an element wire 10 for coil spring is fed from right to left through a (front) guide member 12, feed rollers 14 and 16, and a (rear) guide member 18, and hits against a coiling point 20 capable of being positioned longitudinally to be formed into a coil with a predetermined diameter. Meanwhile, a predetermined pitch is set by a pitch tool 22 capable of being positioned in a direction prependicular to the plane of the drawing, and thus a coil spring is formed on the tip end of the element wire 10. The coil spring formed on the tip end of the element wire 10 is cut off from the wire 10 by a cutter 26 driven by a cam 24 when the wire 10 is fed through a fixed distance. Inside the coil spring 28 is disposed a core bar 30 forming a coiling spring cutting means together with the cam 24 and cutter 26, the core bar 30 forming a cutting edge portion along with the rising cutter 26.

Numeral 32 denotes an encoder which makes a pulse signal with a repetition frequency corresponding to the travelling speed of the wire 10. Numerals 34 and 36 denote a pair of rollers so disposed as to sandwich the wire 10 therebetween rotating the rotary encoder in proportion to the wire speed.

Further, numeral 38 indicates a feed roller driving unit for rotating the feed rollers 14 and 16, while numeral 54 denotes a motor for driving such unit. Numerals 40 and 42 indicate a coiling point driving unit and pitch tool driving unit respectively; numeral 44 an intermediate mechanism coupled to the motor 54 (junction indicated briefly by a broken line) to rotate the cam 24, 46 a measuring device for determining the dimensions of the coil spring before cutting, and 48 a guide member for leading the cut coil spring to a selector 50. The selector 50 sorts the cut off coil springs according to the inspection results from the measuring devic 46.

The feed roller driving unit 38 may be operated by a continuously rotating motor 54 (FIG. 1) such as induction motor, synchronous motor, or common DC motor, and is provided with two systems of speed changing mechanisms (not shown) for transmitting the rotation of such motor 54 to the feed rollers 14 and 16, clutches 56 and 58 (FIG. 9) arranged between the speed changing mechanism and the feed rollers 14 and 16 to select either one out of the two systems of speed changing mechanisms, and a brake 60 (FIG. 9) for damping the free rotation of the feed rollers 14 and 16 when these clutches are opened. The intermediate mechanism 44 is to operate the cam 24 at a predetermined point of time receiving the rotation diverging from the motor 54 for cutting the coil spring 28, containing a clutch 62 (FIG. 9) and a brake 64 (FIG. 9) for damping the free rotation of the cam 24 when the clutch 62 is opened.

The coiling point driving unit 40 and the pitch tool driving unit 42 for moving forward or backward the coiling point 20 and the pitch tool 22 respectively to form the desired coil spring, as well as the above-mentioned devices and mechamisms, are mounted on a base or floor 78 and NC-controlled by a microcomputer 80 mounted on the same base or floor.

Figure 2:
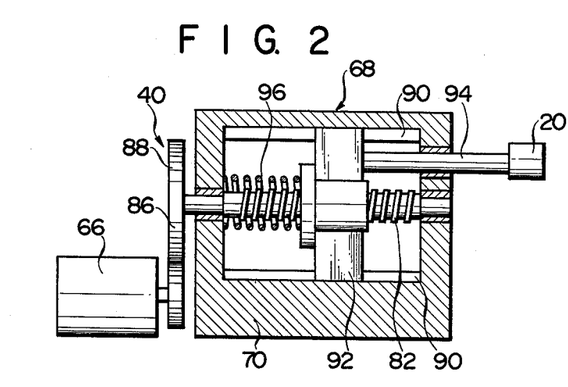
FIG. 2 is a partially sectional front view of the diameter tool driving unit.

The coiling point driving unit 40, as shown in FIGS. 1 and 2, has a pulse motor 66 and a diameter tool feed mechanism 68 operated by the motor 66 to shift the coiling point 20 in the right or forward direction and the left or backward direction. When the coiling point 20 is moved forward, the coiled portion of the coil spring 28 is reduced in diameter; when the coiling point 20 is moved backward, the coiled portion is enlarged. In the coiling point driving unit 40 as shown in FIG. 2, numeral 82 denotes a feed screw or ball screw with both ends borne by a housing 70 which is rotated by the pulse motor 66 through gears 86 and 88. The ball screw 82 is fitted with a moving member 92 engaged with guide grooves 90 provided on the housing 70 at the top and bottom end portions, the member 92 moving to the left or right as in the figure according to the rotating direction of the pulse motor 66. To the moving member 92 is fixed a first driving member 94 protruding beyond the housing 70 to the right in parallel with the ball screw 82 and having a coiling point 20 attached to the tip end thereof. On the left side of the moving member 92, there is a compression spring 96 put loosely on the ball spring 82 and thrusting the moving member 92 to the right.

In retreating the coiling point 20 to the left, the load applied to the pulse motor 66 is increased due to the action of the compression spring 96, while in advancing the coiling point 20 to the right, such load is decreased. In general, the coiling point 20 is moved at a relaticely low speed and hence the pulse motor 66 is operated at a low speed, so that the motor 66 may provide satisfactory torque, causing no trouble in coil spring forming. In manufacturing a conical spring, however, although the coiling point 20 may be retreated at a relatively low speed in the conical section forming process, the element wire should be cut at the periphery of the maximum-diameter portion after such portion is formed on the terminal end of the conical section, so that the coiling point 20 is required to be advanced quickly to push such periphery to the operative position of the cutter 26, thereby cutting the element wire. The reason for this is that the element wire will form a curved extension protruding from the periphery of the aforesaid maximum-diameter portion toward the center if the coiling point 20 is advanced slowly. That is, if the element wire is cut in such condition, the extension will be left at the bottom portion of the conical spring. In order to advance the coiling point 20 quickly as mentioned above for avoiding such situation, the pulse motor 66 must be rotated quickly, so that the pulse motor 66 will be subject to substantial load. In addition, as the pulse motor 66 has such a property that its torque is decreased at time of quick rotation, a means for reducing said load should preferably be provided when advancing the coiling point 20 quickly. The compression spring 96 is thrusting the coiling point 20 forward through the moving member 92, so that the load on the pulse motor 66 required for adcancing the coiling point 20 may be reduced. Thus the coiling point 20 may advance quickly to provide a conical spring without any extension as mentioned above. Therefore, the pulse motor 66 used need not be of a specially large capacity. Besides the aforesaid function, the compression spring 96 acts oppositely to the thrust force applied against the coiling point 20 to retreat it, so the thrust load applied between the moving member 92 and the ball screw 82 by such thrust force may be reduced, thereby facilitating movement of the moving member 92.

Figure 3:
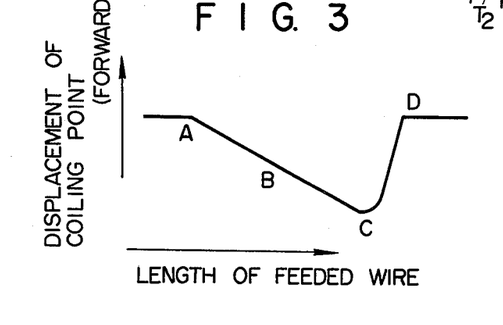
FIG. 3 is a graph illustrating the relation between the distance covered by the element wire and the movement of the diameter tool at time of manufacturing a conical spring.

FIG. 3 shows the relation between the wire feed or distance covered by the element wire and the movement of the coiling point 20 in forming a conical spring. The coiling point 20 moves backward from position A corresponding to the head portion of the conical spring accompanying the wire feed to form a conical section between A and C through B. Thereafter, the coiling point 20 is advanced quickly from C to D, where the element wire is cut immediately. As may be seen from FIG. 4, the retreating speed of the coiling point 20 between A and C through B is low, while the advancing speed of the coiling point 20 between C and D is high. The compression spring 96 is compressed between A and C through B and extended between C and D to reduce the load on the pulse motor 66.

Figure 4:
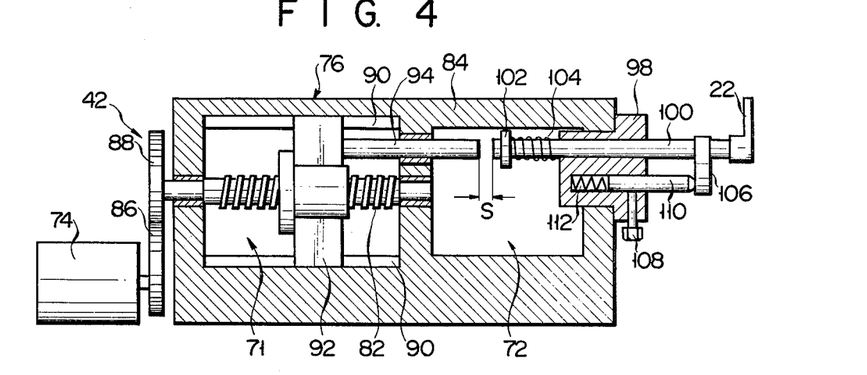
FIG. 4 is a partially sectional front view of the pitch tool driving unit.

The pitch tool driving unit 42, as shown in FIG. 4, is provided with a pulse motor 74 and a pitch tool feed mechanism 76 driven by the motor 74 to move the pitch tool 22 in a direction perpendicular to the plane of FIG. 1, thereby determining the pitch of the coil spring. The mechanism 76 has a housing 84 and first and second mechanisms 71 and 72 built in such housing respectively. The first mechanism 71 is similar to the first feed mechanism 68 for driving the coiling point 20 and is driven by the pulse motor 74. The rotation of the pulse motor 74 is transmitted to the ball screw 82 through the gears 86 and 88, and the moving member 92 is moved from side to side as in FIG. 4 together with the first driving member 94 extending in parallel with the ball screw 82.

The second mechanism 72 is fitted with an attachment 98 at the end portion of the housing 84. In the attachment is inserted a second driving member 100 slidably passing therethrough coaxially with the first driving member 94. A compression spring 104 is inserted between a flange 102 disposed at the left end portion of the second driving member 100 and the attachment 98, while the second driving member 100 is energized to the left. Further, at the right end of the member 100 is attached the pitch tool 22, on the left side of which a stopper holder 106 is mounted. The stopper holder 106 is brought into contact with a stopper 110 inserted slidably in the attachment 98 in parallel with the second driving member 100 and positioned by a fixing bolt along with the action of the compression spring 104. When the fixing bolt 108 is loosened, the stopper 110 is moved to the right by a spring 112 inserted in the attachment 98. When the fixing bolt 108 is loosened, the second driving member 100 is moved to the left or right to keep a suitable space S between itself and the right end of the first driving member 94, and then the fixing bolt 108 is tightened, the stopper 110 is to be positioned properly.

In the second mechanism 72 as shown in FIG. 4, the second driving member 100 is moved to the left or retreated to a position determined by the stopper 110, and there is a space S between the first and second driving member 94 and 100. At this time, the pitch tool 22 is in the backmost position, which is suitable for forming a closely coiled section on the coil spring. Keeping the pitch tool 22 in the above position, when the element wire is shifted with the coiling point 20 set at a desired position, the element wire will first form a closely coiled section at the end portion of the coil spring. At this time, the pulse-motor 74 has previously been started by the instruction signal from the microcomputer 80 to rotate at a high speed, and first driving member 94 has shifted to the right at a high speed to reach the position nearest to the second driving member 100, so that the second driiving member 100 and hence the pitch tool 22 start to advance to the right at a high initial speed immediately after the closely coiled section is formed. Consequently, the pitch tool 22 shifts from the initial position to the predetermined position in a short time, while the pitch of the coils spring increases drastically from the closely coiled section toward a section to be given a predetermined pitch, and the pitch angle of the coil varies from a relatively wide angle corresponding to the initial speed to an angle for the predetermined pitch at a high speed.

In forming the closely coiled section at the terminal end portion of the coil spring, the pulse motor 74 is rotated reversely to move the first driving member 94 to the left. The pitch tool 22 and the second driving member 100 are shifted to the left by the action of the compression spring 104, and stopped suddenly from the operative state at a speed when the stopper holder attached to the second driving member 100 is brought into contact with the stopper 110. Therefore, the pitch of the coil spring at the terminal end portion is decreased suddenly from the predetermined pitch to the level corresponding to the close coiling, reducing the time required for such process.

In the coil spring formed in the aforesaid procedure, the transient sections at both ends are short and the pitch is increased drastically toward the section with the predetermined pitch, so that, when the coil spring is compressed, there will be produced few small-pitch portions which will overlie the closely coiled sections at both ends to deteriorate the performance of the spring. The coil spring with such high performance may be obtained by starting the pitch tool 22 from the initial close coiling position at the initial speed, shifting it to the position for the predetermined pitch at a high speed, shifting the pitch tool 22 again from the position for the predetermined pitch toward the close coiling position at a high speed when the terminal end portion of the coil spring is reached, and then stopping it suddenly at the close coiling position from the operative position at a speed.

Figure 5:
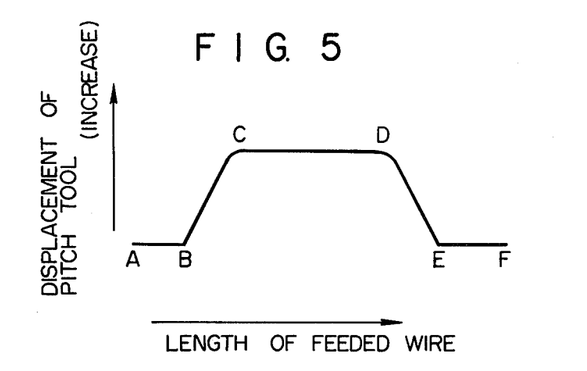
FIG. 5 is a graph illustrating the relation between the distance covered by the element wire and the movement of the pitch tool at time of manufacturing a cylindrical spring.

FIG. 5 illustrates the relation between the movement of the pitch tool 22 and the wire feed in forming a cylindrical spring. In the figure, the axis of abscissa indicates the wire feed or the distance covered by the element wire, while the axis of ordinate stands for the movement of the pitch tool. Line A-B indicates the position of the pitch tool coiling the closely coiled section at one end of the cylindrical spring. Point B indicates the point where the pitch tool starts to shift at the initial speed after forming the closely coiled section, while line B-C indicates the transient section where the pitch tool shifts gradually from point B to the coiling position with the predetermined pitch. Line C-D indicates the position of the pitch tool coiling at the predetermined pitch. The pitch tool is once stopped at the C-D line position for coiling at the fixed pitch. After completion of coiling at the predetermined pitch section, the pitch tool is quicly shifted along line D-E toward line E-F where the closely coiled section is formed. Line E-F indicates the same position with line A-B. Point E indicates a point where the pitch tool, which has reached line E-F at a speed, is stopped suddenly. Line E-F corresponds to the section where the closely coiled section is formed at the other end of the coil spring. Lines B-C and D-E in FIG. 5 correspond to the aforementioned transient portions, which in the apparatus of the invention, are so formed that such lines B-C and D-E rise from lines A-B and E-F respectively at an acute angle to reach line C-D in a short time, thus providing a high-performance coil spring.

If the attachment 98 is removed from the housing with the position of the stopper 110 kept fixed by the fixing bolt 108 and is stored as it is, such stored attachment 98 may be attached entire to the housing 84 in manufacturing coil springs of the same shape, thereby simplifying substantially the arrangements for manufacturing coil springs.

Further, if the coiling point feed mechanism 68 and the pitch tool feed mechanism 76 are employed, the coiling point 20 may be advanced at a high speed, and besides the pitch tool at the closely coiled section of the coil spring may be started and stopped quickly, reducing the time required for the manufacture of coil springs and thereby improving the productivity. Although the pulse motor 74 is started to rotate before the pitch tool 22 starts from the position for forming the closely coiled section and is stopped after continued rotation subsequent to the stop of the pitch tool at such position, such continued rotation is to be made within the idle time as regards the coil spring forming, so that it will never reduce the production efficiency of the apparatus as a whole.

Figure 6:
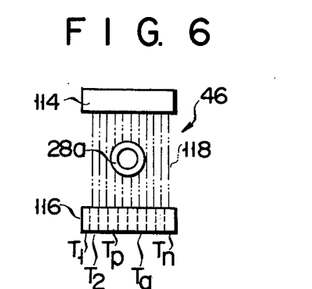
FIG. 6 illustrates the measuring device as shown in FIG. 1 in the measuring condition.

FIG. 6 is a detail drawing of the measuring device 46 the mounting location of which is indicated by a chain line in FIG. 1. The measuring device 46 is used for measuring the dimensions of the uncut coil spring 28 formed by the coil forming tools 20 and 22. In FIG. 6 there is illustrated a case in which the outside dimension of a cylindrical spring 28a is measured. The measuring device 46 has a light source section 114 and a sensor section 116 disposed in parallel with each other. Between the two sections 114 and 116 is formed a parallel light 118 incident upon the sensor section 116 at right angles. The coil spring 28a is disposed substantially perpendicular to the parallel light 118 and produces an unilluminated portion corresponding to the configuration thereof on the surface of the sensor section 116. On the face of the sensor 116 facing the light source section 114 is regularly arranged a plurality of photoelectric elements. The shape and disposition of these photoelectric elements are to be selected according to the shape and size of the spring. For instance, in measuring the diameter of the coil spring 28a, a number of such elements may be arranged in a direction perpendicular to the longitudinal axis of the coil spring 28a. Meanwhile, in measurement of various dimensions, the photoelectric elements should preferably be arranged in the said direction as well as in a direction perpendicular thereto to form a matrix-like configuration. T1, T2, ... Tp ... Tq ... Tn of FIG. 6 denote n photoelectric elements composed of such as silicon diode arranged in a direction perpendicular to the longitudinal axis of the coil spring 28a.

Figures 7, 8:
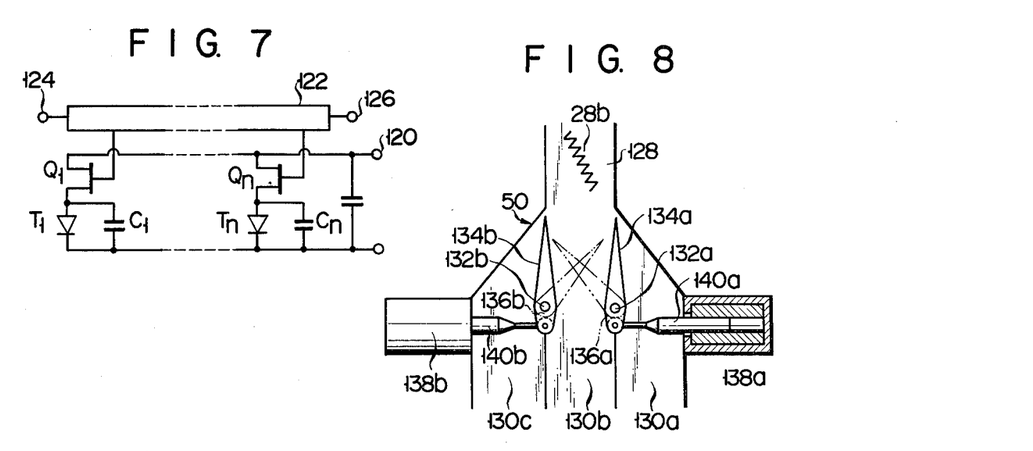
FIG. 7 illustrates a scanning circuit to be used in measurement as illustrated in FIG. 6.
FIG. 8 is a sectional front view of the selecting device as shown in FIG. 1.

FIG. 7 illustrates the principle of measurement on the aforesaid unilluminated portion by means of the photoelectric elements. The photoelectric elements T1 to Tn are connected in parallel with capacitors C1 to Cn respectively. Such parallel circuit is connected to an output terminal 120 through MOS transistors Q1 to Qn the control terminals of which are connected to a shift resistor 122. When a clock pulse at a predetermined frequency (e.g. 1 MHz) from a pulse generator (not shown) is supplied to an input terminal 124, the photoelectric elements T1 to Tn are scanned successively through the transistors Q1 to Qn, and a "scanning over" signal is transmitted from an output terminal 126 when such scanning is completed. If the "scanning over" signal is supplied to the input terminal 124, the scanning will be performed continuously. In such scanning, the nonilluminant photoelectric elements $Tp$ to $Tq$ generate no or low pulse signals, if any, while the illuminant elements generate high pulse signals. Accordingly, the number of the nonilluminant photoelectric elements ($q - p + 1$) corresponding to the outside dimensions of the coil spring 28a and the number of the illuminant photoelectric elements ($n - (q - p + 1)$) may be obtained by counting the low and high pulses separately. For example, if the space between each two photoelectric elements is 25.4$\mu$, the outside diameter of the coil spring may be obtained by multiplying said ($q - p + 1$) by 25.4$\mu$, while the inside diameter of the coil spring 28a may be obtained by subtracting the diameter of the element wire from such outside diameter. All these operations are accomplished by the microcomputer.

In measuring the free length of the coil spring 28a, the photoelectric elements are arranged in the direction of such length and scanning in such direction is to be performed. Further, if the photoelectric elements are arranged in the longitudinal direction of the coil spring 28a as well as in a direction perpendicular thereto to form a matrix-like configuration, and scanning in both such directions is performed successively, all the measurements covering diameter, free length, etc. may be taken suitanly.

In measuring the dimensions of the coil spring, if the coil spring 28a is of a relatively large size, two sensor sections may be disposed at a predetermined distance and then the measurement results may be obtained including such distance.

Further, in such measurement, even if the coil spring is subject to vibration, highly accurate results may be obtained by setting the space between the photoelectric elements at a length as short as e.g. 25.4$\mu$ as mentioned above and setting the frequency of the clock pulse as high as 1 to 10 MHz to provide a sufficiently high scanning speed. Since such measurement is to be performed digitally by using pulse signals, set of suitable upper and lower limits will secure highly reliable measurement results free from any influence of the changes in the environmental conditions such as temperature, humidity, and dust, unlike the case of analog measurement.

FIG. 8 is a detail drawing of the selecting device 50 as shown in FIG. 1. Into the selecting device 50 is dropped a coil spring 28b cut off by the cutter 26 after measurement by the measuring device 46 through the guide member 48 (FIG. 1) and a passage 128. The passage 128 is diverged into three passage 130a, 130b and 130c. Within the selecting device 50 is provided rocking arms 134a and 134b mounted on the shafts 132a and 132b respectively and each having one end extending upward in the direction toward the passage 128. These rocking arms 134a and 134b have driving arms 136a and 136b extending downward from the shafts 132a and 132b respectively. The bottom end portions of the shafts 132a and 132b are coupled to attraction members 140a and 140b movably inserted in the interior of magnets 138a and 138b respectively.

When the two magnets 138a and 138b are not excited, both rocking arms 134a and 134b are energized to turn upward as shown in FIG. 8 to allow the passage 128 to communicate with the passage 130b alone, thereby letting out the coil spring 28b through the passage 130b. Meanwhile, when either one of the magnets, e.g. the magnet 138a is excited by a signal from the microcomputer in such a manner as mentioned hereinafter, the attraction member 140a is attracted by the magnet 138a to turn the rocking arm 134a counterclockwise, thereby allowing the passage 128 to communicate with the passage 130a alone and letting out the coil spring 28b through the passage 130a. Likewise, when the magnet 138b is excited, the rocking arm 134b is turned clockwise to let out the coil spring through the passage 130c. Although the magnets 138a and 138b are used for turning the rocking arms 134a and 134b in the above example, there may alternatively be employed a suitable driving means such as step motor and rocking actuator. Thus, the coil springs 28b may be classified into three groups by optionally exciting and de-exciting the magnets 138a and 138b. That is, the dimensions of the coil springs measured by the aforesaid measuring device are compared with the predetermined values by means of the computer, the coil springs 28b are classified into three groups, e.g. those within, above, and below the allowable range, and the signals corresponding to such groups are transmitted to the magnets 138a and 138b.

Figure 9:
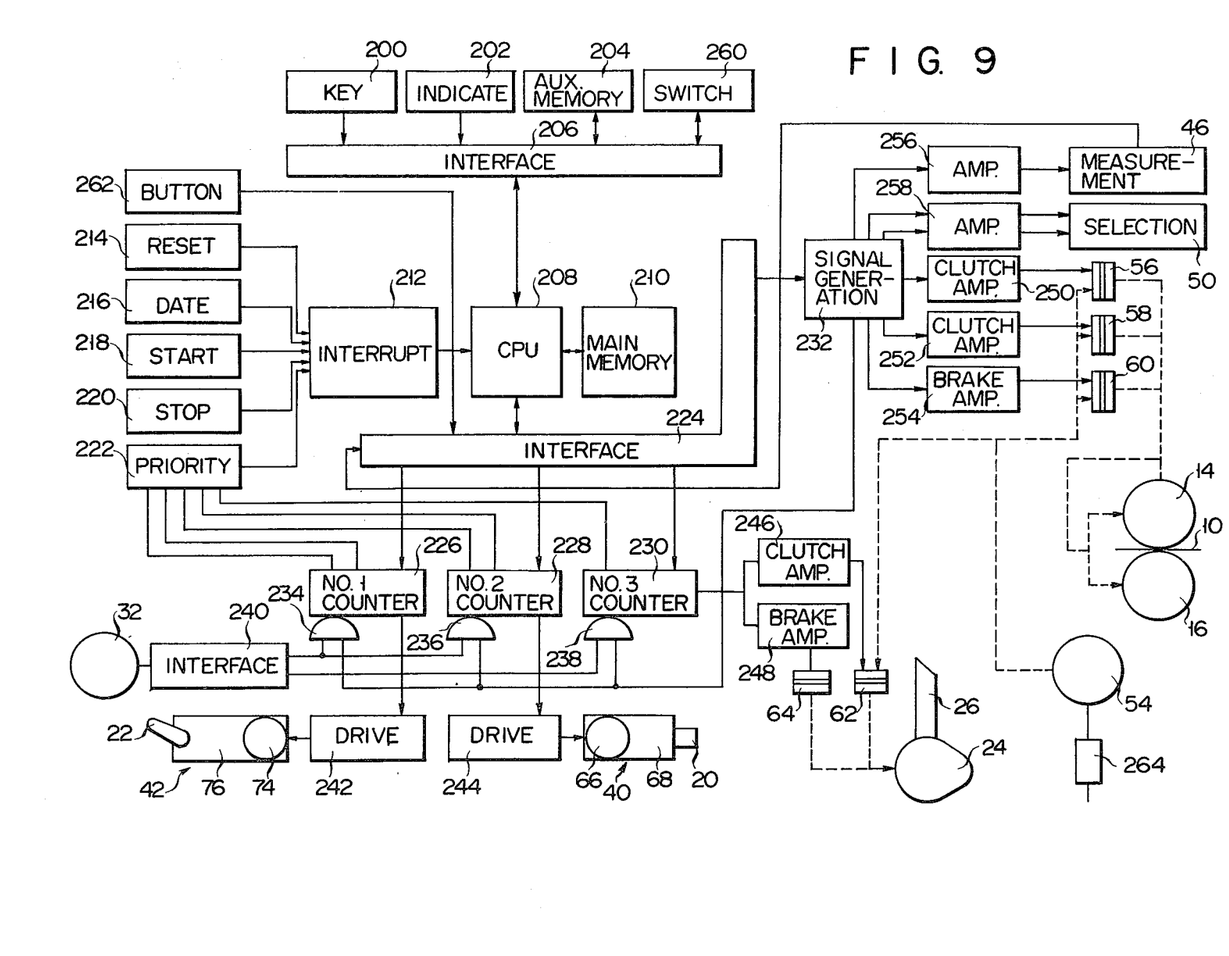
FIG. 9 is a block diagram illustrating the operation of the apparatus as shown in FIG. 1.

Referring now to FIG. 9, there will be described the control system of the NC coil spring manufacturing apparatus employing the microcomputer. The broken lines indicate the mechanical transmission, and the names appearing in the figure are abbreviated. A key board or input unit 200, a display section 202 employing e.g. CRT, and an auxiliary memory 204 employing such as magnetic card or paper tape are connected to a CPU or central processing unit 208 through an interface 206. The CPU 208 is connected to a main memory 210 and an interrupt circuit 212, which is connected with a reset switch 214, a data switch 216, a start switch 218, a stop switch 220, and a preference interrupt circuit 222. Further, the CPU 205 is connected to first, second and third counters 226, 228 and 230 and a control signal generator 232 through an interface 224. Each one terminal of AND circuits 234,, 236 and 238 provided respectively for the input terminals of the first, second and third counters 226, 228 and 230 is connected to the rotary encoder 32 through an interface 240. The first and second counters 226 and 228 supply the interrupt interface 212 with coincident signals through the preference interrupt circuit 222, and supply drive units 242 and 244 respectively with their output signals. The drive units 242 and 244 are suited for rotating the pulse motors 74 and 66 respectively, and supply such pulse motors 74 and 66 with fully potent driving signals. The third counter 230 supplies a clutch amplifier 246 and a brake amplifier 248 with output signals corresponding to the input signals. The clutch amplifier 246 supplies power for operating a clutch 62 provided for a mechanism to couple the motor 54 for driving the feed rollers 14 and 16 to the cam 24 for operating the cutter 26 (FIG. 1), while the brake amplifier 248 transmits a potent operating signal to the brake 64 for damping the free rotation of the cam 24 when the clutch 62 is opened. The control signal generator 232 receives signals from the CPU 208 through the interface 224, and transmits first, second, third, fourth and fifth control signals according to such signals. The first control signal is transmitted to the other terminals of the AND circuits 234, 236 and 238, while the second control signal is supplied optionally to either of clutch amplifiers 250 and 252 to operate either of the clutches 56 and 58 and to drive either of the two systems of speed changing mechanisms (not shown) provided between the motor 54 and the feed rollers 14 and 16 respectively, thereby changing the speed of the feed rollers 14 and 16 and hence the travelling speed of the element wire 10 by two stages, high and low.

The third control signal is supplied to a brake amplifier 254, which operates the brake 60 in cooperation with the clutches 56 and 58 to damp the rotation of the feed rollers 14 and 16 from time to time. The fourth control signal is supplied to an amplifier 256 and, when amplified, transmitted to the measuring device 46 to start such device 46. The fifth control signal is transmitted to the selecting device 50 via an amplifier 258, while the selecting device 50 operates the magnets 138a and 138b optionally, thereby classifying the coil springs into three groups.

A group of switches 260 connected to the interface 206 operate to stop the coiling point 20 and the pitch tool 22 at reference positions previously at the outset of the operation of this apparatus. A manual button-switch 262 for pulse motor connected to the interface 224 is used for moving the coil forming tools or the coiling point 20 and the pitch tool 22 independently of other parts, while a switch 264 connected to the power circuit of the motor 54 is used for rotating the motor 54 regardless of other parts. When the motor 54 is not engaged with the clutches 56, 58 and 62, however, it only continues to run idle.

While I have partially described the main components of the apparatus of this invention and their functions by way of illustration, there will now be described the operation of the apparatus as a whole. In storing control data for the manufacture of coil springs in the microcomputer (FIG. 1), first the reset button 214 is depressed, reset signals are transmitted to the CPU 208 through the interrupt circuit 212, and all the reset programs are executed. At this time, all the flip-flops are switched to the reset position. Subsequently, when the aforesaid control data including coil spring diameter, pitch, free length, and coil shape are applied to the input by means of the key board 200, the CPU 208 computes the predetermined number of the positions to be taken by the coil forming tools corresponding to the distance covered by the element wire on the basis of the relatively simple data, and stores such number in the main memory 210. The display section 202, which indicates the input data applied to the key board 200, is convenient for identifying the inputting operation. Thereafter, the pulse motor button 262 is depressed to shift the coil forming tools 20 and 22 to the abovementioned reference starting points and shift them further to their respective positions suitable for the manufacture of the coil spring or the relative starting points. The subsequent operations of the coil forming tools 20 and 22 will be performed with such relative starting points considered as their respective reference points.

Thus, in manufacturing coil springs according to the data stored in the main memory, when the switch 264 is first closed to rotate the motor 54, and then the start switch 218 is depressed to transmit the start signal to the CPU 208 through the interface 212, the second control signal is transmitted to the clutch amplifier 250 or 252 correspondingly to the data transmitted to the control signal generator section 232 through the interface 224 to drive the clutch 56 or 58, and the third control signal is transmitted to the brake through the brake amplifier 254, thereby rotating the feed rollers 14 and 16 at two speeds, high and low, and running the element wire 10 at either high or low speed.

When the element wire 10 runs as described above, the rollers 34 and 36 (FIG. 1), as well as the rotary encoder 32 coupled thereto, rotate. Since the rotary encoder 32 is mounted carefully so as to avoid slipping off the element wire 10, there is transmitted a pulse signal at a repetitive frequency corresponding to the travelling speed of the element wire 10 from the rotary encoder 32. The pulse interval included in such signal is equivalent to a fixed length of the element wire. The pulse signal is supplied to each one end of the AND circuits 234, 236 and 238 provided in the input circuits of the aforesaid first, second and third counters 226, 228 and 230. Further, these counters 226, 228 and 230 are supplied with data for the respective points corresponding to the positions along which the coil forming tools 20 and 22 are to be shifted successively and data corresponding to the distance covered by the element wire 10 for which the cutter 26 is to be driven through the CPU 208 and the interface 224, and such data is stored in these counters for a time. Since the other terminals of the aforesaid AND circuits are supplied with the first control signal transmitted from the control signal generator section, the pulse signals from the rotary encoder 32 are inputted to the counters 226, 228 and 230 respectively.

The pulse signals inputted to the first and second counters 226 and 228 are subjected to dividing, converted into signals suitable for driving the pulse motors by the drive units 242 and 244, and supplied to the pulse motor 74 of the pitch tool driving unit 42 and the pulse motor 66 of the coiling point driving unit 40 to rotate such motors 74 and 66 according to directions from the CPU 208 and to shift the pitch tool 22 and the coiling point 20 according to the predetermined programs. For example, the pulse motor 66 is driven until the data on the predetermined movement of the coiling point corresponding to a distance covered by the element wire transmitted from the main memory 210 to the second counter 228 coincides with the actual distance covered by the wire calculated according to the signal transmitted from the rotary encoder 32. When such coincidence is attained, a coincident signal is transmitted from the second counter 228. The coincident signal is given to the CPU 208 through the preference interrupt circuit 222 and the interrupt circuit 212. According to this signal, the data on the subsequent position to be taken by the coiling point 20 is transmitted from the main memory 210 to the second counter 228, where such data is stored in lieu of the previously stored data. Therefore, the coiling point 20 is moved until the newly given level of movement is attained, which is repeated to perform coil forming in accordance with the programs given by the CPU 208. Such procedure also applies to the case in which the pitch tool 22 is driven by the pitch tool driving unit 42. When the coiling process of the coil spring is advanced and the predetermined expansion length of the coil spring transmitted from the main memory 210 to the third counter 230 coincides with the distance covered by the element wire 10 calculated according to the pulse signal transmitted from the rotary encoder 32 to the third counter 230, a coincident signal is transmitted from the third counter. The coincident signal is led to the CPU 208 through the preference interrupt circuit 222 and the interrupt circuit 212. The output signal from the CPU 208 is transmitted to the control signal generator section 232 through the interface 224, where the fourth control signal is transmitted to the measuring device 46, which starts measuring the dimensions of the coil spring 28 (FIG. 1). The results of such measurement is transmitted to the CPU 208 through the control signal generator section 232 and the interface 224. In the CPU 208 the results are compared with the data on the coil dimensions stored in the main memory 210. After completion of such comparison, a signal for wire cutting is transmitted from the CPU 208 to the clutch amplifier 246 and the brake amplifier 248 through the interface 224 and the third counter 230, and the clutch 62 is closed to rotate the cam 24 and raise the cutter 26, thus cutting the coil spring 28 (FIG. 1). When such cutting process is completed, the cutter 26 is lowered to the original position to open the clutch 62, and the brake amplifier 248 drive the brake 54 to damp the free rotation of the cam 24, thereby holding the cutter in the lowered position. The cut coil spring 28b (FIG. 8) is led to the selecting device 50.

When the cutting process for the coil spring 28 is accomplished, the CPU 208 transmits signals for selection to the control signal generator section 232 through the interface 224 according to the measurement results from the measuring device 46 to operate optionally the magnets 138a and 138b (FIG. 8) attached to the selecting device 50, thereby classifying the coil springs 28b (FIG. 8) into three groups.

According to the NC coil spring manufacturing apparatus of this invention, there may be automatically produced coil springs with the uniform free length which have a specified shape of end turn or closely coiled section at the end portion. That is, this apparatus is combined with a sensor head (not shown) capable of detecting the tip end of the coil spring 28, a reference coil spring is first formed, the sensor head is so located as to be able to detect the tip end of such coil spring without cutting it with the cutter, and such location is stored in the computer. In the subsequent coiling of coil springs, each time the tip end of one of such springs reaches the storing position, the clutches 56 and 58 and the brake 60 are suitably driven to stop the feed rollers 14 and 16, and the coil spring 28 is cut off by means of the cutter 26, thereby securing manufacture of coil springs with uniform free length. In coiling the coil spring in such procedure, it is necessary to keep a somewhat superfluous length of end turns at the terminal ends or the closely coiled sections. If the end turn is formed by a single turn or so, such end turn will be stretched open, rendering the coil spring with proper free length defective.

Moreover, in the NC coil spring manufacturing device of this invention, when the element wire 10 supplied for the coil spring 28 (FIG. 1) has attained the predetermined length, that is, the coil spring forming process is completed, the rotation of the feed rollers 14 and 16 are immediately stopped by the instruction signals transmitted from the microcomputer 80 through the third counter 30 utilizing the operating function of the CPU 208, and the self-learning mechanism is effected so as to cut the element wire 10 after a predetermined short time. In order to reduce the time required for cutting off the coil spring for improvement of the productivity, the coil spring 28 should preferably be cut off from the element wire 10 substantially on completion of the forming of the coil spring. In practice, however, the cutter 26 may be operated to cut off the coil spring 28 before completion of such forming due to external disturbance. Further, there may be interposed a process for measuring the dimensions of the coil spring 28 by the measuring device 46 after forming the coil spring 28 before cutting it off, though for a short time in this apparatus, so that the coil spring should preferably be cut off after a prescribed time $t_O$ from such forming. The shorter the time $t_O$ is, the higher the productivity may be. The time required from forming through cutting off of the coil spring, i.e. the cutting time $t$ may be brought in line with the aforesaid prescribed time $t_o$ in the following manner.

First the prescribed time $t_O$ is stored in the microcomputer. In manufacturing the coil spring for the first time, the cutter 26 is started after forming the coil spring 28 to cut it off, and the cutting time $t$ is determined and compared with $t_O$. If $t_O < t$, the start time for the cutter 26 stored in the memory storage 210, in the second production, is to be so modified as to be a little earlier than that in the first time. After completion of second cutting off, the cutting time $t$ is determined again, and subjected to the similar modification according to comparison with $t_O$. Such modification is repeated successively until $t_O$ and $t$ coincide with each other within the allowable error. If the cutting time $t$ coincides with the prescribed time $t_O$ through such self-learning, the coil spring 28 may be cut off quickly after forming, reducing the time required for the manufacture of coil springs. In this case, the cutting time $t$ may be varied by external disturbance even after coincidence with the prescribed time $t_O$, so that it should preferably be subjected to checking on each occasion. All these operations are performed on the basis of the automatic control by the microcomputer 80.

If the difference between the measurement result according to the measuring device 46 and the prescribed value or set point exceeds the allowable range, the CPU 208 may calculate modified data and supply it to the main memory 210, correct the stored information, and thereafter supply the modified data successively to the first, second and third counters 226, 228 and 230, thereby controlling the actions of the coiling point 20, pitch tool 22, and cutter 26 and securing self-learning for the manufacture of coil springs with the predetermined dimensions.

In altering the information stored in the main memory 210 separately from the aforesaid self-learning, the data switch 216 is depressed and then altered data may be stored in the main memory 210 by means of the key board 200.

The auxiliary memory 204 may store the information stored in the main memory 210, so that, in manufacturing coil springs with uniform shape and dimensions, the operations required for data inputting may be simplified substantially by transferring the stored information from the auxiliary memory 204 to the main memory 210. Since the initially inputted data are modified by the self-learning and then stored in the auxiliary memory 204, use of such auxiliary memory 204 may substantially reduce the time required for the trial coiling at the beginning of coil spring manufacture.

As described above, the NC coil spring manufacturing apparatus of this invention is operated automatically and continuously by the microcomputer 80 including the CPU 208 and the main memory 210, and has various advantages as follows; the memory capacity may be given at a high level; simplified input data for coil springs secure automatic calculation and storage of the detailed control data required for NC control according to the predetermined programs, saving us the time for calculation; highly reliable measurement results obtained by the digital measurement of coil dimensions secure capability of self-learning for correcting the information stored in the main memory 210 and enable the coil springs to be classified into desired groups; provision of the coiling point driving unit 40 may allow the element wire 10 for conical spring to be cut substantially at the outer periphery of the large-diameter terminal end; provision of the pitch tool driving unit 42 may allow the portion of the element wire shifting from the closely coiled sections formed on both sides to the coiled section with the predetermined pitch to be separated drastically from such closely coiled sections, thereby providing high performance coil springs; use of the coiling point driving unit 40 and the pitch tool driving unit 42 secure quick shifting and stopping of the coiling point 20 and the pitch tool 22 as well as cutting off of coil springs within a short time after forming, thereby reducing the time required for production of coil springs to improve the productivity; the diverse programs for the microcomputer 80 facilitate forming springs with complicated shapes such as cylindrical springs, conical springs and barrel-shaped springs as well as springs combining cylindrical shape with conical shape.

Figure 10:
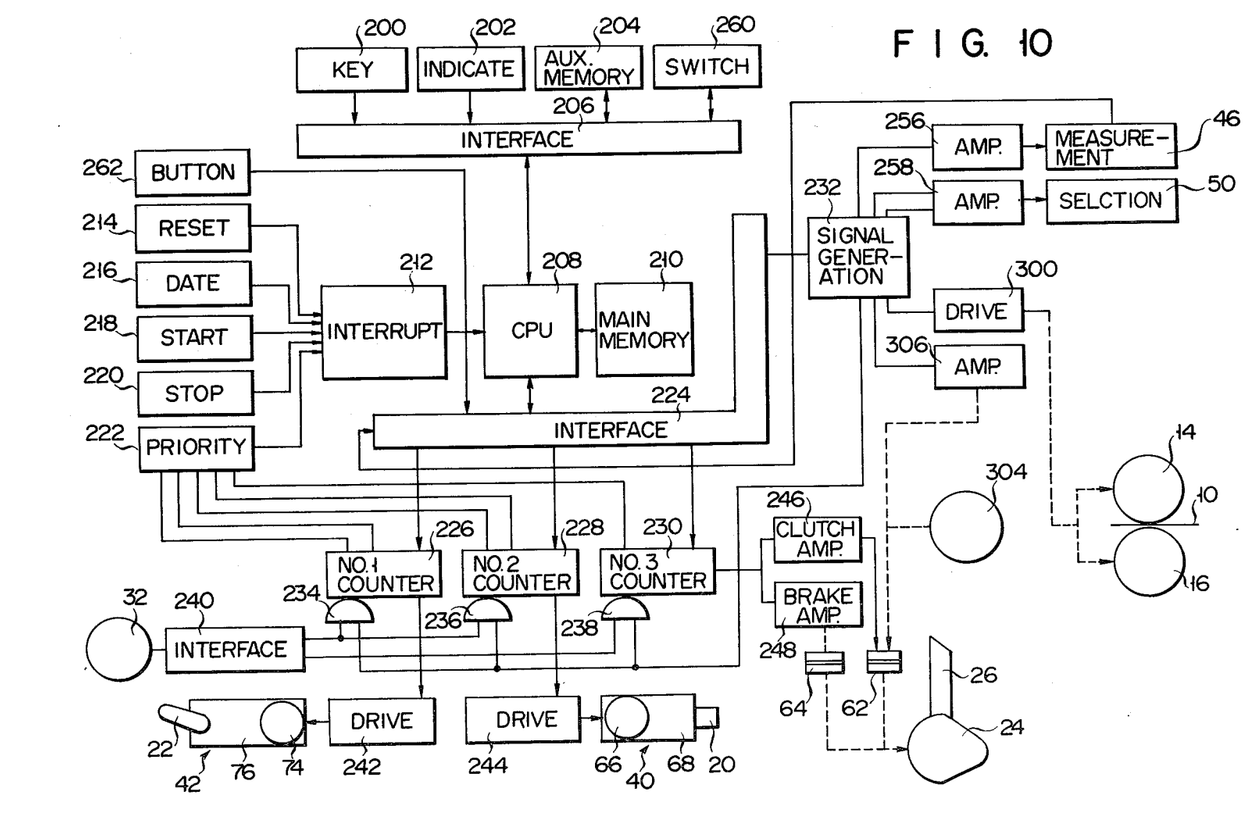
FIG. 10 is a block diagram illustrating the operation when the pulse motor is used for driving the feed rollers.

FIG. 10 is a block diagram illustrating the operation of a modified example in which there is used a pulse motor 302 to be supplied with signals transmitted from the signal generator section 232 and amplified by an amplifier 300 in lieu of the induction motor or the like (54 as in FIG. 9) including induction motor, synchronous motor and DC motor for driving the feed rollers 14 and 16. Also in this case, the cutter 26 is moved vertically by the cam 24 driven by a continuously rotating motor, for example an induction motor 304 supplied with control signals from the signal generator section 232 through the amplifier 306 similarly to the induction motor or the like 54 as shown in FIG. 9. Since such action is the same as the case of FIG. 9, further description will be omitted. In using FIG. 9, numeral 54 denoting the motor as shown in FIG. 1 should be changed into numeral 302. The induction motor 304 may be attached to a suitable portion such as the intermediate mechanism.

Rotation of the pulse motor 302 may be made highly diversely and accurately in accordance with the instruction signals transmitted from the CPU 208 through the signal generator section 232, eliminating the need of feedback circuit which may generally be required where there is used no pulse motor. Further, there will be no need of the two systems of speed changing mechanisms and the clutches 56 and 58 as well as the brake 60 for selection of such mechanisms either. The driving signals given for controlling the pulse motor 302 to provide such advantages are operated on the basis of the signals transmitted from the rotary encoder 32 to the CPU 208 through the various electric circuits, i.e. the pulse signals at a frequency corresponding to the speed of wire feed.

The NC coil spring manufacturing apparatus with such construction and function as illustrated in FIG. 10 has additional advantages besides those obtained from the apparatus of FIG. 9.

What we claim is:

1. A NC apparatus for manufacturing coil springs, said springs having closely coiled end portions and portions of changing pitch extending from said end portions and merging with the ends of an intermediate portion of coil turns having a predetermined pitch, said apparatus comprising: a coil spring forming mechanism having a pitch tool, a diameter tool, and a cutter; feed rollers for feeding an element wire into said coil spring forming mechanism; a mechanism for driving said feed rollers; a microcomputer having a memory storage and a central processing unit; an input unit for inputting data for coil spring forming into said computer; a rotary encoder for transmitting a pulse signal at a frequency corresponding to the travelling speed of said element wire; first, second and third counters for receiving setting signals transmitted from said computer and pulse signals transmitted from said rotary encoder and transmitting control signals for driving said pitch tool, coiling point, and cutter respectively; a first pulse motor and a second pulse motor to rotate upon receipt of control signals from said first and second counters respectively, thereby to drive said pitch tool and diameter tool, respectively, so as to form a coil spring, and a pitch tool feed mechanism driven by said first pulse motor for rapidly advancing said pitch tool at an initial speed from a first position where said pitch tool serves to form the closely coiled end portions of a coil spring to a second position where said pitch tool serves to form the coil turns at said predetermined pitch between the closely coiled end portions, said initial speed being sufficient to reduce the extent of said portions of changing pitch to a minimum, and for rapidly moving said pitch tool from the second position and abruptly stopping said pitch tool at the first position after the coil turns have been formed.

2. A NC coil spring manufacturing apparatus according to claim 1, wherein said pitch tool feed mechanism is provided with a housing; a first mechanism located within said housing and including a converting means to convert the rotation of said first pulse motor into a linear reciprocation and a first driving member protruding from said converting means to perform said reciprocation together with said converting means; and a second mechanism including, a second driving member having said pitch tool attached to its tip end, biased toward the inside of said housing and adapted to reciprocate concurrently with said first driving member through one side of said housing in parallel direction to the moving direction of said first driving member and a stopper means attached to said housing to restrict the motion of said second driving member toward the inside of said housing, said second driving member, when stopped by said stopper member, being separated from said first driving member over a predetermined distance.

3. A NC coil spring manufacturing apparatus according to claim 2, wherein said converting means includes a feed screw supported in said housing and driven by said first pulse motor and a moving member in screw engagement with said feed screw and capable of reciprocating linearly along said feed screw so as to cause said first driving member to reciprocate.

4. A NC coil spring manufacturing apparatus according to claim 1, further comprising a digital measuring device for measuring the dimensions of a formed coil spring in accordance with a signal which said third counter generates when its pulse signal count corresponding to the distance covered by said element wire has attained a predetermined value stored in the memory of said microcomputer; and a cutter device for cutting the element wire upon receipt of every signal from said third counter.

5. A NC coil spring manufacturing apparatus according to claim 1, wherein said means for driving said feed rollers comprises a pulse motor driven by signals transmitted from said microcomputer.

6. A NC coil spring manufacturing apparatus according to claim 1, further comprising a diameter tool feed mechanism provided with means for urging said diameter tool in the opposite direction to the moving direction of the element wire so as to reduce the load on said second pulse motor when said diameter tool is driven by said second pulse motor in said opposite direction.

7. A NC coil spring manufacturing apparatus according to claim 6, wherein said diameter tool feed mechanism is provided with a housing; a driving member having said diameter tool attached to its tip end, and adapted to reciprocate through one side of said housing; and a converting means located within said housing and driven by said second pulse motor so as to convert the rotation of said second pulse motor into said reciprocation of said driving member.

8. A NC coil spring manufacturing apparatus according to claim 7, wherein said converting means includes a feed screw supported in said housing and driven by said second pulse motor, and a moving member in screw engagement with said feed screw and capable of reciprocating along said feed screw so as to cause said first driving member to reciprocate.

9. A NC coil spring manufacturing apparatus according to claim 8, wherein said energizing means is a compression spring disposed in said housing and adapted to urge said moving member in the direction opposite to the moving direction of the element wire.

10. A NC coil spring manufacturing apparatus according to claim 6, further comprising a digital measuring device for measuring the dimensions of a formed coil spring in accordance with a signal which said third counter generates when its pulse signal count corresponding to the distance covered by said element wire has attained a predetermined value stored in the memory of said microcomputer; and a cutter device for cutting the element wire upon receipt of every signal from said third counter.

11. A NC coil spring manufacturing apparatus according to claim 6, wherein said means for driving said feed rollers comprises a pulse motor driven by signals transmitted from said microcomputer.

* * * * *